UNITED STATES PATENT OFFICE.

WILLIAM D. RICHARDSON, OF CHICAGO, ILLINOIS, ASSIGNOR TO SWIFT & COMPANY, OF CHICAGO, ILLINOIS, A CORPORATION OF ILLINOIS.

PROCESS OF HYDROGENATING OILS OR FATS.

1,177,896.

Specification of Letters Patent. Patented Apr. 4, 1916.

No Drawing. Application filed November 11, 1912. Serial No. 730,749.

*To all whom it may concern:*

Be it known that I, WILLIAM D. RICHARDSON, a citizen of the United States of America, and a resident of Chicago, county of Cook, and State of Illinois, have invented certain new and useful Improvements in Processes of Hydrogenating Oils or Fats, of which the following is a specification.

The object of this invention is to provide an improved method of hydrogenating oils or fats to harden or solidify them. This object is accomplished by the following described process:

I first put in a suitable tank or container a body of the oil or fat to be hydrogenated. This container is preferably fitted with an agitating or spraying device and is capable of being heated to a temperature of 150 to 200 degrees C. or thereabout, and adapted to permit the contents to be heated and mixed under pressure. Two metallic pieces are submerged in the oil or fat to be hardened and are connected with a suitable device for supplying an electric current through said pieces. These pieces serve as electrodes being suitably spaced apart, and provided with sufficient current to produce an electric arc across the gap between them, and to cause part of the metal of said electrodes to be diffused in finely divided form in said oil or fat. The electrodes suitable for this purpose may be nickel, copper, platinum, palladium, iron, or their alloys, or other metal or alloys. These electrodes may be conveniently used in the form of rods, and the electric current may be operated by a hand feed or an automatic arc lamp mechanism in which the rods are clamped. The rods may be entirely or partly submerged in the oil or fat. The electric current is operated preferably at a voltage of from 40 to 150 and is preferably a direct current. The arc is allowed to continue until the desired amount of disintegrated or finely divided metal has been diffused in the oil or fat to produce the desired degree of hardening in the desired time in treating the oil with hydrogen or gas containing hydrogen. The oil or fat may also be subjected to the action of the arc between electrodes of the desired metals in a separate vessel or tank, and after the catalyzer is produced therein by the arc, be transferred to the hydrogenating apparatus. The hydrogen or gas containing hydrogen is preferably introduced under pressure while the mass is being agitated. The percentage of disintegrated metal diffused in the oil or fat to be hydrogenated may be from 1 to 3 per cent. by weight. More or less may be used if desired. The greater the amount of the disintegrated metal used, the faster the hydrogenation proceeds.

When operating under about 40 pounds pressure and with a temperature of about 160 degrees C. the process of hardening or solidifying of the oil or fat may be completed in from one to eight hours, depending upon the percentage of the finely divided metal used, the kind of oil or fat being hardened, the rapidity of agitation, etc., and upon the degree of hardness desired.

After the hydrogenation of the oil or fat has been accomplished, the finely divided metal may be removed from the mass, as by straining, or filtering, and may be used to hydrogenate other oil than that in which it was prepared and with which it was used.

Cross reference is hereby made to my co-pending applications Serial Nos. 730,745, 730,746, 730,748, and 26,305, in which are described and claimed certain features of invention relating to catalyzers and fat hydrogenating processes more or less disclosed but not fully claimed herein.

I claim:—

1. The process of hydrogenating oil or fat which consists in producing an electric arc between metallic electrodes submerged in a body of the oil or fat to be hydrogenated and thereby disintegrating part of the metal and causing it to enter said body in finely divided form, and thereafter introducing hydrogen into said body.

2. The process of hydrogenating oil or fat which consists in producing an electric arc between metallic electrodes submerged in a body of the oil or fat to be hydrogenated and thereby disintegrating part of the metal and causing it to enter said body in finely divided form, thereafter introducing hydrogen into said body until hydrogenation takes place to a desired extent, and then removing the disintegrated metal.

3. The process of hydrogenating oil or fat which consists in producing an electric arc between nickel electrodes submerged in a body of the oil or fat to be hydrogenated and thereby disintegrating part of the nickel and causing it to enter said body in finely divided form, and thereafter introducing hydrogen into said body.

4. The process of hydrogenating oil or fat which consists in producing an electric arc between nickel electrodes submerged in a body of the oil or fat to be hydrogenated and thereby disintegrating part of the nickel and causing it to enter said body in finely divided form, thereafter introducing hydrogen into said body until hydrogenation takes place to a desired extent and then removing the disintegrated metal.

Signed at Chicago this 25th day of October, 1912.

WILLIAM D. RICHARDSON.

Witnesses:
I. O. BEATTY,
ARTHUR CORBISHLEY.